United States Patent [19]

Anderson et al.

[11] 3,712,434
[45] Jan. 23, 1973

[54] SYNCHRONIZING FLEXIBLE COUPLING

[75] Inventors: Norman J. Anderson, Fairview; John L. Decker, Erie, both of Pa.

[73] Assignee: Zurn Industries, Inc., Erie, Pa.

[22] Filed: Aug. 2, 1971

[21] Appl. No.: 168,268

[52] U.S. Cl. .................... 192/53 E, 64/9 R, 74/448, 192/65
[51] Int. Cl. ........ F16d 23/06, F16d 3/18, F16h 55/12
[58] Field of Search ........ 192/53 B, 53 E, 53 F, 53 G, 192/65; 64/9 R; 74/448

[56] References Cited

UNITED STATES PATENTS

| 1,886,850 | 11/1932 | Tenney | 192/53 E X |
| 2,175,911 | 10/1939 | Peterson | 192/53 E |
| 2,633,954 | 4/1953 | Allen | 192/53 E |
| 3,475,043 | 10/1969 | Anderson | 64/9 R X |
| 3,480,123 | 11/1969 | Anderson et al. | 64/9 R X |

*Primary Examiner*—Allan D. Herrmann
*Attorney*—Edward W. Goebel, Jr.

[57] ABSTRACT

A synchronizing, flexible coupling includes a pair of conically shaped friction clutch members, one of which is made up of a plurality of contiguous segments. Each of the segments can pivot to and fro on crown teeth and can move back and forth in an axial direction. By pivoting and moving axially during rotation when the friction clutch members make contact, the segments allow the friction clutch members to contact one another without damage, even though the shafts to be coupled are out of alignment with one another.

12 Claims, 13 Drawing Figures

SYNCHRONIZING FLEXIBLE COUPLING

BACKGROUND OF THE INVENTION

This invention relates to gear-type couplings which connect one rotatable shaft to another rotatable shaft and, more particularly, to clutch mechanisms for such couplings which allow the rotation of both shafts to become synchronized prior to interconnecting the gears of both shafts with a coupling sleeve or hub.

It is often desirable to connect one rotatable shaft to another rotatable shaft so that objects mounted on each of these shafts can be rotated at the same speed. For example, a turbine may be connected to one of these shafts, and an electric generator, which is to be driven by this turbine, may be mounted on the other of these shafts. Mechanical couplings have long been used between these shafts, with these couplings commonly comprising rotatable assemblies having gears at either end adapted to mesh with gear-teeth provided on hubs or sleeves which are mounted on the ends of the two shafts. Normally, one of these shafts, often referred to as a driving shaft, is continuously connected to the coupling. The other of the shafts often referred to as the driven shaft, can be connected and disconnected from the coupling as desired.

It has often been desirable to synchronize the speeds of the two shafts, prior to causing the teeth of the disconnectable shaft to mesh with the teeth of the coupling, thereby preventing the destruction of gear teeth which would render the coupling inoperable. Couplings of this type are described and claimed in U.S. Pat. No. 2,640,573 Shenk, No. 3,089,575 Pontius, and No. 3,480,123 Anderson, each of which is assigned to the assignee of this invention.

While the synchronizing couplings as described and claimed in the above-listed patents have proved to be entirely satisfactory for many applications, it is often desirable to interconnect shafts which are rotating at relatively high speeds. Interconnecting shafts at these relatively high speeds has provided problems which were not dealt with by prior synchronizing couplings. For example, at high speeds of revolution the total coupling, including the clutch mechanism, must remain in dynamic balance. Couplings including frustro-conically shaped clutch mechanisms have been found to be the most satisfactory from this standpoint.

One of the problems which is troublesome with respect to couplings operating at all speeds, and which is particularly troublesome for interconnecting couplings rotating at relatively high speeds, is the fact that the rotatable shafts which are to be interconnected may be misaligned with respect to one another. This misalignment can occur in either a vertical direction or a horizontal direction, or in both directions. It can vary in amount during the operation of the shafts due to factors such as thermal expansion and contraction of the shafts and apparatus connected to the shafts, and the like. When the shafts are misaligned, the mating portions of the usual clutch mechanisms are also misaligned and an edge or corner of one tends to rub on a surface of the other. Even with the use of the frustro-conically shaped clutch mechanisms, misalignment of the mating portion of clutch mechanisms has caused malfunctioning of the clutch and undue wear on clutch members when the clutch is engaged.

It is, thus, an object of this invention to provide a synchronizing, flexible coupling which is capable of operating at relatively high speeds of rotation without adverse effects on the coupling members.

It is another object of this invention to provide a synchronizing, flexible coupling which is capable of causing a pair of shafts rotating at a relatively high speed to rotate at the same speed without causing damage or undue wear to the coupling, even though the shafts may be misaligned with respect to one another.

BRIEF DESCRIPTION OF THE INVENTION

Briefly stated, and in accordance with one aspect of this invention, a synchronizing, mechanism causes a first rotatable shaft to be connected to a second rotatable shaft when the speed of rotation of the first shaft equals the speed of rotation of the second shaft. The synchronizing mechanism is a portion of a rotatable assembly or synchronizing flexible coupling of the type discussed above which is normally, continuously connected to the second rotatable shaft. A flexible clutch mechanism for this coupling comprises a first member having frustro-conically shaped surface means, and a second member having surface means for engaging the frustro-conically shaped surface means of the first member. One of these members rotates with the second continuously connected shaft while the other of these members is fastened to the first shaft. The surface means of at least one of the first and second members comprises a plurality of contiguous surface members mounted about its axis. Each of these contiguous members can rock to and fro in an axial direction, and is also free to slide along a selected portion of the axis. Thus, if the frustro-conically shaped surface means of the first member is misaligned axially with respect to the second member, the individual surface members are able to move sufficiently while the first and second members are coming into engagement to prevent damage as a result of misalignment.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings. The same number is used to designate identical parts in more than one drawing.

DESCRIPTION OF PREFERRED EMBODIMENTS

Figure 1:
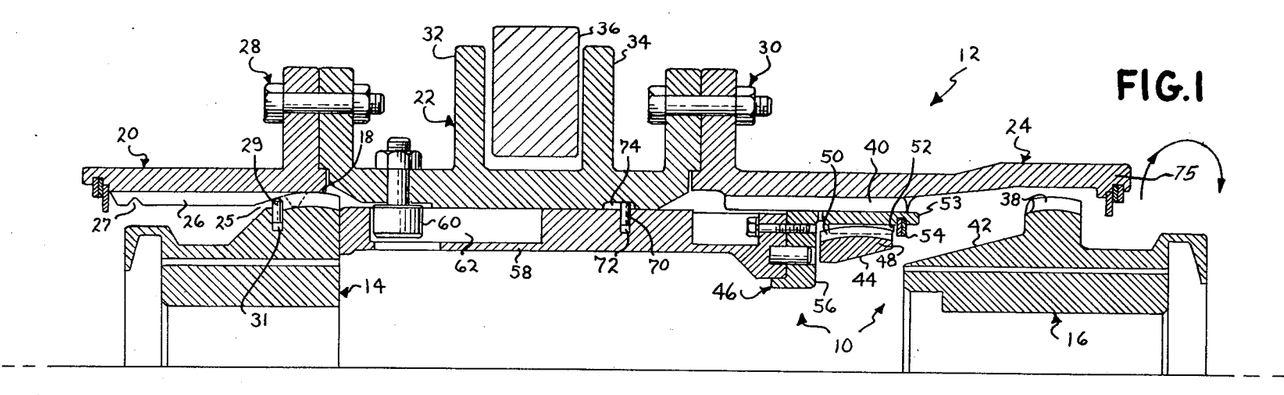
FIG. 1 is a partial cross-sectional view of a rotatable coupling assembly according to this invention with the coupling teeth at one end thereof disengaged.

Referring now more specifically to the drawings, and in particular to FIG. 1, the synchronizing, flexible coupling of this invention is used to interconnect a pair of rotatable shafts. In FIG. 1 a synchronizing mechanism 10 is mounted near one end of a rotatable clutch assembly or synchronizing flexible coupling 12 which is used to interconnect a rotatable shaft which can be connected to a hub 14 with a second rotatable shaft which can be connected to a hub 16. The hubs 14 and 16 are included in the synchronizing flexible coupling 12. By way of example, the shaft connected to the hub 14 may be a driving shaft, that is a shaft connected to a source of power such as a turbine, while the shaft connected to the hub 16 may be a driven shaft, that is a shaft connected to a load such as an electric generator which is to be driven by the source of power.

Figure 2:
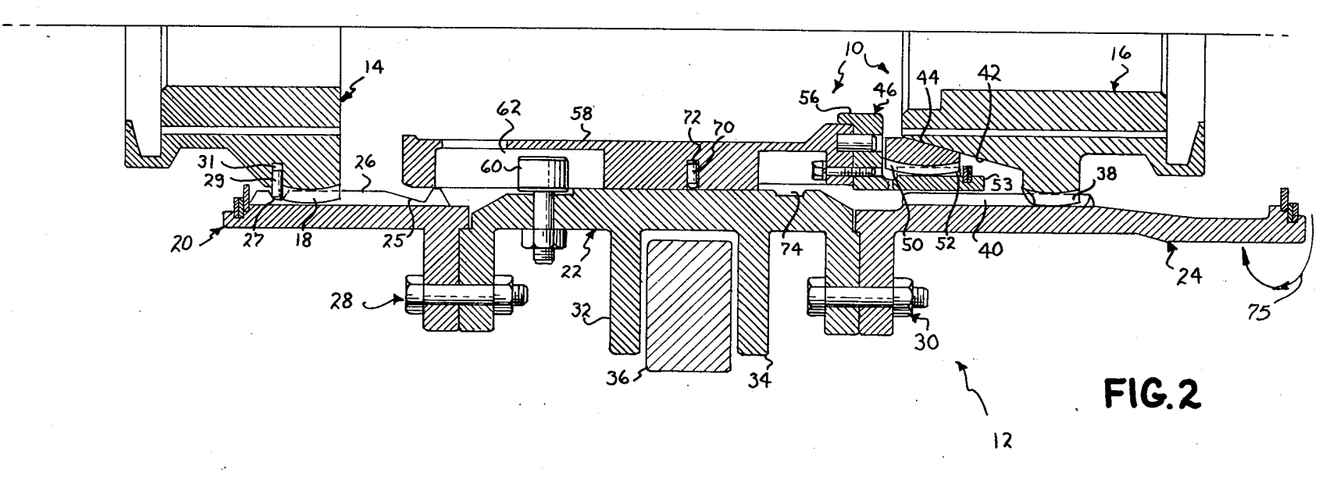
FIG. 2 is a partial cross-sectional view of the rotatable coupling assembly of FIG. 1 with the coupling teeth at both ends engaged.

Assuming that the hub 14 is connected to the driving shaft, the hub 14 includes a plurality of crown teeth 18 mounted about one end of its external periphery for transmitting power from the driving shaft and through a cylindrical sleeve assembly comprising a sleeve 20, a spacer 22, a sleeve 24, and the hub 16, to the driven shaft. The sleeve 20 has a plurality of teeth 26 extending in an axial direction on its internal surface for engaging the crown 18 of the hub 14. Each of the teeth 26 has a notch 25 near the interior end thereof adjacent the spacer 22 and a notch 27 at its opposite end. These notches 25 and 27 are engaged by a detent ring 29 mounted in a slot 31 in the hub 14 as the sleeve assembly is shifted toward the left, as shown in FIG. 1, and to the right as shown in FIG. 2. The ring 29 may be of the type described in U.S. Pat. No. 3,475,043 Anderson, which is assigned to the assignee of this invention.

Furthermore, detent pins of the type described in U.S. Pat. No. 3,475,043, or other devices known to those skilled in the art may be used for retaining the relative positions of the hub 14 and the sleeve 20.

The sleeve 20 is connected to the spacer 22 through the use of nut and bolt assemblies 28, while the other end of the spacer 22 is connected to the sleeve 24 through nut and bolt assemblies 30. The spacer 22 includes a pair of flanges 32 and 34 engaged by a shifting collar 36 which is connected to a mechanism (not shown) for shifting the sleeve assembly, including the sleeves 20, the spacer 22, and the sleeve 24, longitudinally to the left, as shown in FIG. 1, and longitudinally to the right as shown in FIG. 2. The mechanism connected to the shifting collar 36 may be of the general type shown in U.S. Pat. No. 3,513,955 Anderson, which is assigned to the assignee of this invention.

The hub 16 includes a plurality of crown teeth 38 mounted about its external periphery. The teeth 38 are adapted to engage a like plurality of teeth 40 which extend in an axial direction on the internal periphery of the sleeve 24. When the crown teeth 38 are out of engagement with the teeth 40 on the hub 24, as shown in FIG. 1, power cannot be transmitted through the rotatable clutch assembly 12. However, when the crown teeth 38 come into engagement with the teeth 40 of the sleeve 24, as shown in FIG. 2, power can be transmitted from the shaft attached to the hub 14 and through the sleeve 20, the spacer 22, and through the sleeve 24 to the hub 16.

To keep the tips of the disengaged hub teeth 38 in radial alignment with the sleeve teeth 40, the coupling can be provided with a cylindrical bearing ring (not shown) between the hub teeth 38 and the sleeve 24. A ring of this type is disclosed in U.S. Pat. No. 3,451,515 Anderson which is assigned to the assignee of this invention. Such a ring has a plurality of teeth with slots therebetween to receive the hub teeth 38 and keep them in proper alignment with the sleeve teeth 40. As an alternative, the right hand end of the sleeve 24, as shown in FIGS. 1 and 2, may be supported on its external surface through the use of a bearing which is held rigid by an external support member.

In accordance with this invention, the teeth 38 of the hub 16, come into engagement with the teeth 40 of the sleeve 24 while the clutch assembly is rotating through the use of synchronizing mechanism 10. The synchronizing mechanism 10 includes a flexible clutch mechanism which comprise a first member 42 having frustro-conically shaped surface means and a second member 44 having surface means for engaging the frustro-conically shaped surface means of the first member. The first member 42 in the first embodiment shown in FIGS. 1 and 2 comprises the intermost portion of the hub 16, while the second member 44 comprises a portion of an internal sleeve assembly 46. In further accordance with this invention, the surface means of at least one of the first and second members 42 and 44 comprises a plurality of contiguous surface members mounted about the axis of rotation of this member. In the embodiment of this invention shown in FIGS. 1 and 2, the second member 44 is made up of the plurality of contiguous members or sections 48 which are mounted about the periphery of an internal sleeve 53.

Figures 3, 4:
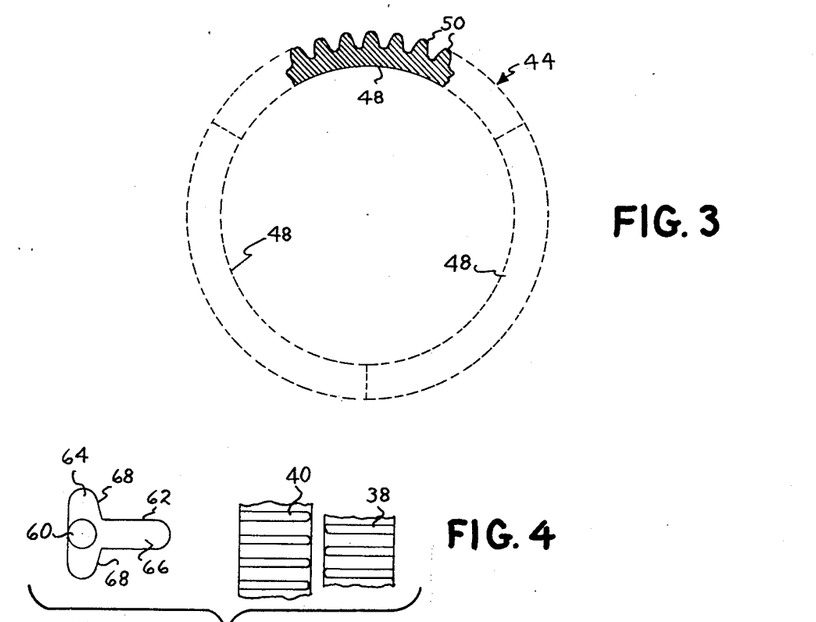
FIG. 3 shows a cross-section of a segmented, frustro-conically shaped member which comprises a portion of a flexible clutch mechanism made in accordance with this invention.
FIG. 4 shows the position of the T-slot and blocking pin combination and the teeth to be coupled, with no engagement between members of the flexible clutch mechanism.

Referring now to FIG. 3 along with FIGS. 1 and 2, the member 44 comprises three contiguous sections 48, each of which has a plurality of crown teeth 50 extending axially along its external surface. One of the sections 48 is shown in partial cross section in FIG. 3, while the remaining sections 48 of the member 44 are shown schematically.

Means are provided on the internal sleeve assembly 46 for mounting the sections 48 of the member 44 in such a manner that each of these contiguous members can rock to and fro in an axial direction, and each of these contiguous sections 48 is free to slide back and forth along a selected distance in the axial direction. Thus, the crown teeth 50 engage teeth 52 mounted around the internal surface of the sleeve 53 of the sleeve assembly 46. A ring assembly 54 acts as a stop which defines the distance which the sections 48 can move back and forth in an axial direction while mounted within the sleeve 52. The distance between the ring assembly 54 and a flange 56 of the sleeve 53 allows the sections 48 of the member 44 to rock to and fro in an axial direction on the crown teeth 50 as well as to slide back and forth axially. As will be explained more fully below with respect to FIGS. 8 and 9, should the hub 16 be misaligned with respect to the rotatable clutch assembly 12, the sections 48 of the clutch member 44 are able to move sufficiently by rocking to and fro on the crown teeth 50 and by sliding in an axial direction so that the frustro-conically shaped clutch member 42 can engage the surface of the member 44 without damaging these members as a result of this misalignment.

The internal sleeve assembly 46 further includes a synchronizing sleeve 58 which is slidably supported on the inner periphery of the spacer 22. A series of blocking pins or cam followers 60 is fastened to the sleeve 22, and each of the pins extends inwardly within one of an equal plurality of T-shaped slots 62. These slots are shown more clearly in FIGS. 4 through 7. These FIGS. also show the relationship between the crown teeth 38 of the hub 16 and the teeth 40 of the sleeve 24 with respect to the blocking pin 60 and the slot 62 both prior to, during, and after the synchronizing process has taken place.

FIGS. 4 through 7 show that the T-shaped slots 62 have a circumferentially extending portion 64 and an axially extending portion 66. Walls 68 of the circumferentially extending portion 64 of the T-shaped slot 62 have a slope which is calculated to prevent the teeth 38 from engaging the teeth 40 until the speed of rotation of the sleeve assembly of the clutch assembly 12 equals the speed of rotation of the hub 16. That is, until their speeds are synchronized. This type of blocking pin and slot assembly is more fully disclosed in U.S. Pat. No. 2,640,537 Shenk and No. 3,089,575 Pontius, et al.

Referring once again to FIGS. 1 and 2, a detent ring 70, similar to the ring 29, is mounted in a slot 72 of the synchronizing sleeve 58 so as to engage a slot 74 about the internal periphery of the spacer 22. In this manner, the internal sleeve assembly 46 is normally held in the position shown in FIG. 1 while the member 42 of the hub 16 is out of engagement with the member 44 of the flexible clutch mechanism.

OPERATION OF FIG. 1 AND FIG. 2

FIGS. 3 through 9 shall be referred to from time to time to aid in explaining the operation of the synchronizing mechanism 10 of the rotatable clutch assembly 12 shown in FIGS. 1 and 2. First assume that a shaft connected to the hub 14 in FIG. 1 is continuously rotating the clutch assembly 12 with the teeth 40 on the sleeve 24 out of engagement with the teeth 38 on the hub 16. The total assembly shown in FIG. 1 excluding the hub 16, is rotating at a speed determined by the rotation of the shaft connected to the hub 14.

When it is desired to interconnect the shaft coupled to the hub 16 with the shaft coupled to the hub 14, the mechanism (not shown) attached to the shifting collar 36 causes this collar to press against the flange 34 and shift the sleeve assembly, including the sleeve 20, the spacer 22, the sleeve 24, and thus, the internal sleeve assembly 46, to the right in FIG. 1. Thus, the teeth 40 on the sleeve 24 are moved axially toward the teeth 38 of the hub 16. At this time, the detent ring 70 engages the slot 74 of the spacer 22 so that the independent axial movement of the internal sleeve assembly 46 is limited and the internal sleeve assembly 46 moves with the spacer 22. Thus, the member 44 of the synchronizing, flexible coupling 10 is moved axially toward the member 42 of this coupling.

Assume that the sleeve assembly of the rotatable clutch assembly 12 is rotating away from the viewer as shown in FIG. 1 and toward the viewer in FIG. 2, as indicated by the arrows 75 at a speed which is faster than the speed of rotation (if any) of the hub 16. When the conical surface of the member 42 on the hub 16 first contacts the mating surface of the member 44 on the sleeve 53, the internal sleeve assembly 46 is rotated toward the reader with respect to the external sleeve assembly to which the pin 60 in connected. That is, prior to contact having been made between the surfaces of the members 42 and 44, the pin 60 was presumed to be in a position selected at random in the T-slot which is illustrated in FIG. 4. Because it is assumed that the sleeve assembly is rotating at a speed which is faster than that of the hub 16 when the surfaces of the members 42 and 44 come into contact, the pins 60 contact the upper end of the circumferentially extending portion 64 of the T-slot 62. By contacting the upper end of the slot portion 64, the pins 60 pull the internal sleeve assembly 46, and thus, the member 44 with them. Due to the friction between the clutch surfaces of the members 42 and 44, the speed of rotation of the hub 16 begins to increase and the speeds of the hub teeth 38 and the sleeve teeth 40 approach synchronization.

Figure 8:
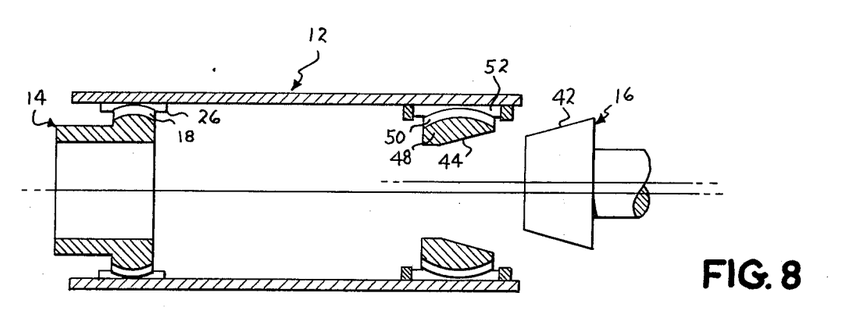
FIG. 8 is a schematic drawing showing the flexible clutch mechanism of this invention in a rotatable clutch assembly which is out of alignment laterally, with a parallel offset with respect to a hub to which it is to be coupled.
Figure 9:
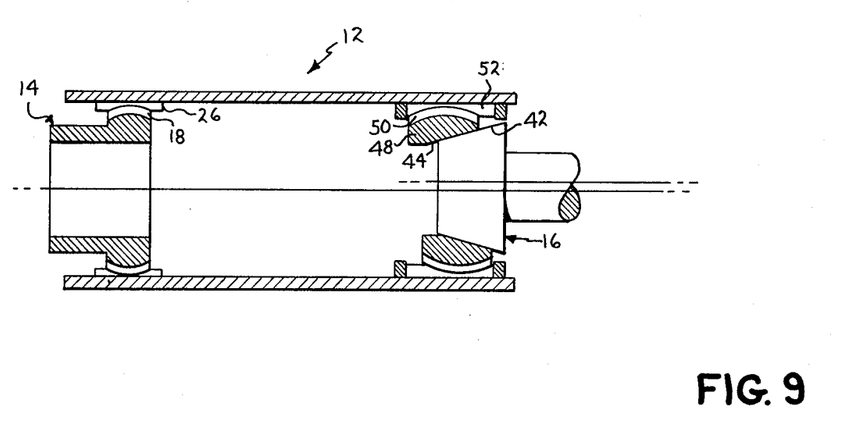
FIG. 9 shows the non-alignment clutch assembly and hub combination of FIG. 8 after contact has been made by the members of the flexible clutch mechanism.

FIGS. 8 and 9 show a schematic diagram of the rotatable clutch assembly 12 which is meant for illustrative purposes only. These FIGS. 8 and 9 show how the sections 48 of the member 44 are used to allow the rotation of the hub 16 to become synchronized with the rotation of the sleeve assembly without damage to the clutch mechanism, even though the axes of the clutch assembly 12 and the hub 16 are out of alignment. The misalignment between these axes, as shown in FIGS. 8 and 9, is a lateral offset which still leaves the axes parallel with each other. The conical surface of the member 42 is parallel with the mating surface of the member 44 as the sleeve assembly and thus, the surface of the member 44, is moved toward the hub 16 in the manner explained above. Because the surface of member 42 is parallel with the surface of member 44, the surface of the member 42 first makes contact with whichever of the sections 48 of the rotating member 44 which is at the uppermost portion of the drawings of FIGS. 8 and 9 at the time of contact. The remaining sections 48 in turn contact the member 44 as rotation of the sleeve assembly continues.

Note that the distance between the ring assembly 54 and flange 56 which define the area in which the members 48 are mounted is greater than the length of the members 48. The first contact between the surface of the member 42 and the surface of the member 44 causes the uppermost of the sections 48 to move toward the flange 56. Each of the other sections 48 is forced into the same position each time it rotates into contact with the upper portion of the member 42. As the sleeve assembly is moved farther toward the hub 16, the member 42 reaches a position where the sleeve assembly is lifted upwardly by the hub 16 so that it pivots or begins to pivot about the crown teeth 18 of the hub 14. FIG. 9 shows that at about this point, the member 44 is also in such a position that the surface of the lower sections 48 thereof can contact the surface of the conical member 42.

Further movement of the sleeve assembly toward the hub 16 prior to synchronizing their speeds is possible without damage to the surfaces of 42 and 44 because each of the sections 48 can pivot to and fro and allow the axis of the rotatable clutch assembly 12 to be at an angle with respect to the axes of the hubs 14 and 16 during the synchronizing process. That is, the axis of the clutch assembly 12 can actually cross the axes of these hubs during the synchronizing process. The synchronizing mechanism 10 is flexible in that the sections 48 of the member 44 can rock to and fro in the axial direction, on the crown teeth 50, and can slide along a selected portion of the length of the axis, between the ring assembly 54 and the flange 56. Thus, the conical surfaces of the members 42 and 44 can engage each other to allow the speed of the hub 16 to become synchronized with the speed of the sleeve assembly without damaging the surfaces of these members. Further movement of the teeth 40 toward the teeth 38 when the hub 16 reaches the synchronizing speed is described below.

Figure 5:
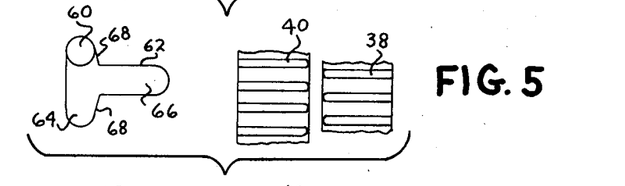
FIG. 5 shows the relationship between the T-slot and blocking pin and the teeth to be coupled when the members of the flexible clutch mechanism first make contact.

Referring now to FIG. 5 along with FIGS. 1 and 2, and assuming the same speed difference and rotation as previously stated, the first contact between the surfaces of the members 42 and 44 causes the pin 60 to engage the upper end of the circumferentially extending portion of the slot 62. With the blocking pin in this position, the internal sleeve assembly cannot be moved toward the left in the drawings, nor can the spacer 22 move toward the right. The hub 14 stays in the position shown in FIG. 1 and the teeth 40 cannot engage the teeth 38 on the hub 16. While the pin 60 engages the upper end of the slot, the shifting collar 36 shown in FIGS. 1 and 2 continues to press against the flanges 34 so that the blocking pin 60 is pressed against the sloping walls 68 of the T-slot 62. The axial force tending to drive the total sleeve assembly toward the hub 16 is balanced by the frictional force between the pin 60 and the sloping cam surfaces 68, preventing the continued movement of the sleeve teeth 40 toward the hub teeth 38.

As the hub 16 and the shaft connected thereto are brought to a synchronized speed with the hub 14 and its shaft, the acceleration of the hub 16 drops toward zero. With this rotational acceleration decreasing, the rotational force on the blocking pin 60 also decreases, decreasing the component of frictional force on the sloping cam surface 68 which has heretofore prevented the movement of the external sleeve assembly to the right toward the hub 16.

Figure 6:
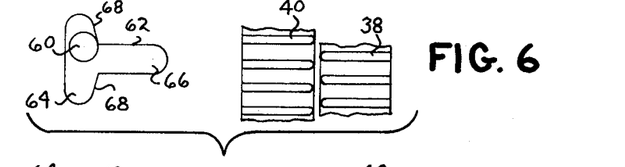
FIG. 6 shows the position of the blocking pin within the T-slot and the relationship of the teeth to be coupled when synchronizing speed is almost reached.
Figure 7:
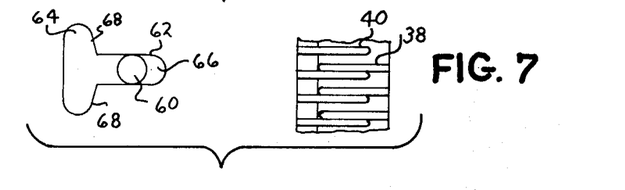
FIG. 7 shows the position of the pin in the T-slot and the teeth after the teeth have been engaged.

When the speed of the hubs 14 and 16 become synchronized, the pin 60 slides down the sloping surface 68 of the T-slot 62 and toward the axially extending portion 66 of this slot, as shown in FIG. 6. Upon synchronization, the pins 60 enter the axially extending portions 66 of the slot 62, allowing the external sleeve assembly to move toward the right and the sleeve teeth 40 to become coupled with the hub teeth 38, as shown in FIG. 7. FIG. 2 shows a rotatable clutch assembly having the teeth 38 engage with the teeth 40.

As can be seen in FIG. 2, the synchronizing mechanism 10 provided with the flexible clutch mechanism of this invention, allows clutch assembly to pivot freely on the crown teeth of the hubs 14 and 16. Furthermore, the individual sections 48 of the clutch member 44 can pivot to allow increased flexibility in the movement of the clutch members during the synchronizing process. Thus, whether the shafts to be interconnected are misaligned laterally, as shown in FIGS. 8 and 9, or are misaligned angularly so that the axis of one of the shafts intersects that of the other of the shafts, the rotatable clutch assembly 12 can pivot between the position of the hubs of both shafts: both while the speeds of the shafts are being synchronized and after the synchronizing speed is reached.

The first embodiment of this invention shown in FIGS. 1 and 2 is for illustrative purposes only. It is possible to provide many variations in the structure of the synchronizing flexible coupling of this invention. Thus, any number of sections 48 may be provided as parts of the member 44, and these sections may be provided as a portion of a sleeve assembly as shown in FIGS. 1 and 2 and may be provided as portions of a hub assembly. It is necessary that the angles between the individual teeth 50 of the sections 48, as shown in FIG. 3 allow the sections 48 to be retained in their mounting positions as the number of sections 48 is increased.

The type of mechanism which prevents the hub teeth 38 and sleeve teeth 40 from engaging until the hub 16 reaches synchronizing speed is not critical to this invention and the blocking pin and T-slot arrangement shown herein may be eliminated, as with a pure friction drive and/or replaced in accordance with the needs of those skilled in the art. The clearance for the sections 48 as mounted in the internal sleeve 53 has been exaggerated somewhat for the purpose of illustration. For some applications, the clearance need be only such as will permit ¼° mechanical misalignment between the axis of the sleeve assembly and the hubs 14 and 16. While not necessarily limited to clutch assemblies operating at any particular range of speeds, this invention is particularly useful for clutch assemblies rotating at relatively high speeds, for example, in the range of from about 3,000 RPM to about 10,000 RPM.

While it is necessary for the purposes of this invention to have the sections 48 pivotably mounted as shown in the drawings, it is not necessary to use crown teeth for this purpose. Thus, the crown teeth 50 may be replaced with other suitable means for allowing the sections 48 to rock to and fro in an axial direction. Where this pivoting or rocking action has been desired for the main coupling teeth of other types of couplings not using crown teeth, extensions have been provided on the hub teeth and the pivoting action was obtained through these extensions.

DESCRIPTION OF FIGS. 10 AND 11

FIGS. 10 through 13 are included to show some of the various types of couplings on which this invention can be used. The examples shown are not exhaustive of the various types of couplings with which the invention can be used, but are included to illustrate the wide variety of uses to which this invention can be put.

Figure 10:
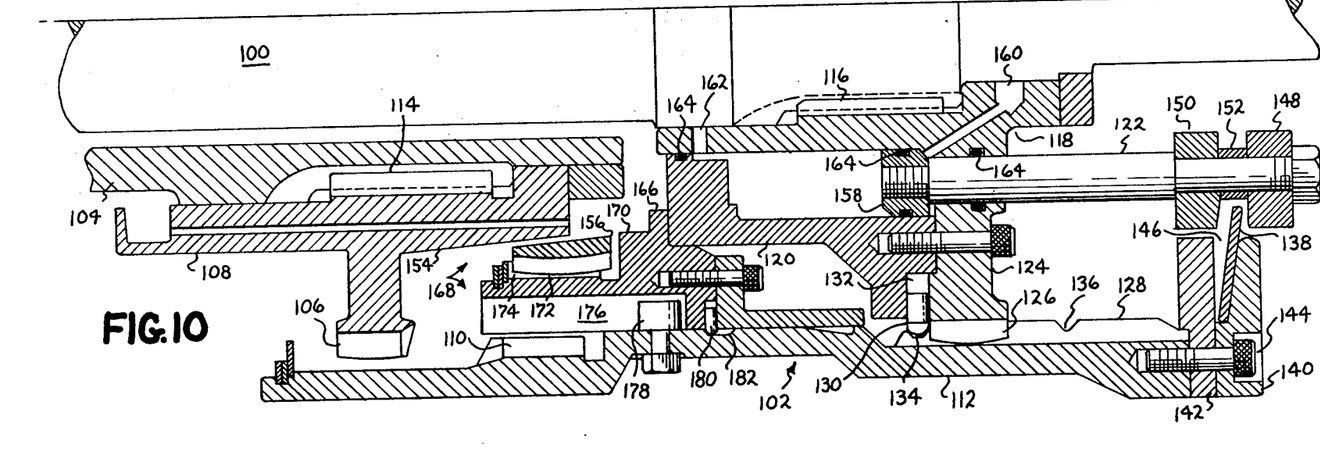
FIG. 10 is a partial cross-sectional view of another embodiment, a rotatable coupling assembly according to this invention, with the coupling teeth disengaged.
Figure 11:
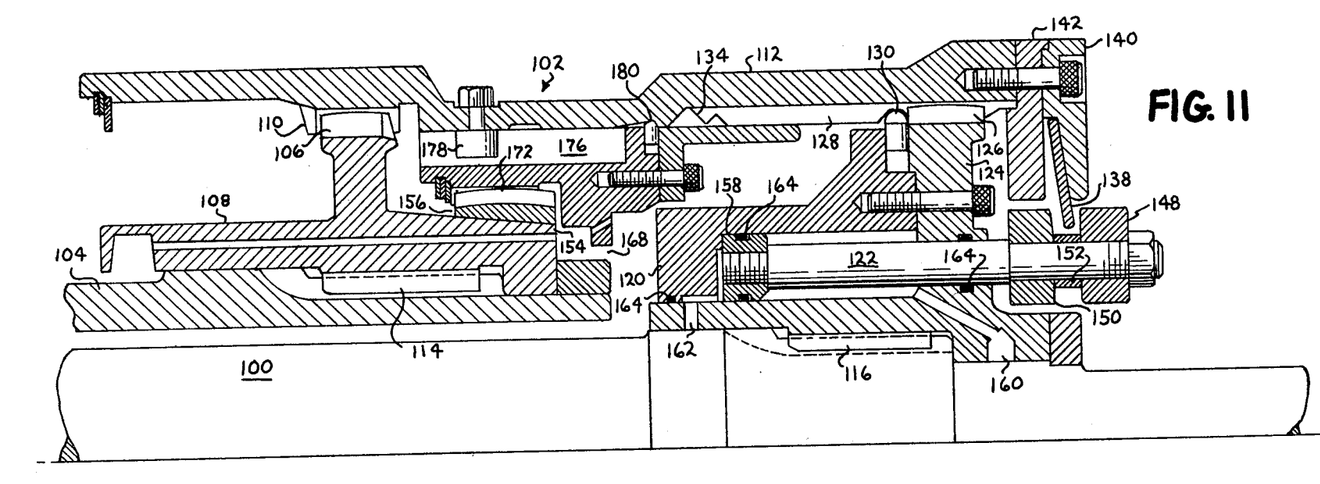
FIG. 11 is a partial cross-sectional view of the rotatable coupling assembly of FIG. 10 with the coupling teeth at both ends thereof engaged.

FIGS. 10 and 11 depict a quill shaft drive arrangement which is typical of installations used for large marine applications. The drive mechanism comprises a quill shaft 100 which is normally the drive shaft. The rotatable clutch assembly or synchronizing, flexible coupling 102 is used to interconnect the quill shaft 100 with a pinion shaft 104. The quill shaft 100 rotates within the pinion shaft 104.

Referring now to FIG. 10, the quill shaft 100 is disconnected from the pinion shaft 104 because hub teeth 106, which are mounted on a hub 108 at the left of FIG. 10 are out of engagement with sleeve teeth 110 which are mounted near the left end of a sleeve 112. The hub 108 is splined to the driven pinion shaft as generally shown at 114. The remaining portion of the rotatable clutch assembly 102 is splined to the quill shaft 100 as generally shown at 116. Thus, this remaining portion of the rotatable clutch assembly 102 rotates with the quill shaft. The hub 108 rotates with the pinion shaft 104. It rotates with the quill shaft 100 only when connected through the teeth 106 and 110 or the synchronizing mechanism as explained below.

The assembly 102 includes a hub 118 having a chamber housing 120 fastened thereto to receive a piston 122. The hub 118 is splined to the quill shaft 100 as discussed above. The housing for the piston 122 is completed through the use of a back plate 124 having a plurality of crown teeth 126 mounted about its external periphery. The crown teeth 126 engage sleeve teeth 128 which are mounted within the sleeve 112. A detent ring 130 is provided in a slot 132 to engage notches 134 and 136 in the teeth 128.

The crown teeth 126 continuously engage the sleeve teeth 128 both while the hub teeth 106 and the sleeve teeth 110 are out of engagement with each other, as shown in FIG. 10, and while they are in engagement with each other as shown in FIG. 11. The teeth 126 and 128 are comparable to the teeth 18 and the teeth 26, respectively, shown in FIGS. 1 and 2. The detent ring 130 is used for the same purpose as the detent ring 29 of FIGS. 1 and 2. Furthermore, the functions of the hub teeth 106 and the sleeve teeth 110 are comparable to those of the hub teeth 38 and the sleeve teeth 40 as shown in FIGS. 1 and 2.

The piston assembly itself further includes a Belleville washer 138 mounted between annular members 140 and 142 which are fastened to the right end of the sleeve 112 through the use of bolts 144. The annular members 140 and 142 form a slot 146 which allows room for the Belleville washer 138 to snap from one position to the other when engaged by either an end member 148 or an end member 150 fastened to the piston 122. A spacer 152 is mounted between the members 148 and 150 so that the Belleville washer 138 fits therebetween to be contacted by the member 148, as the piston 122 moves toward the left in FIGS. 10 and 11, and to be contacted by the member 150 as the piston 122 moves toward the right in these FIGS.

The piston 122 is the means by which members 154 and 156 of the flexible clutch mechanism of this invention are caused to engage one another. The piston 122 includes a piston head 158 which can be forced to the left, as shown in FIGS. 10 and 11, by fluid forced through a passageway 160. The piston 122 can be forced to the right by the pressure of fluid flowing through a passageway 162. Piston rings 164 are seals for the piston chamber.

With the piston 122 at the right end of its chamber and the hub teeth 106 out of engagement with the sleeve teeth 110, the housing 120 engages a portion of an internal sleeve assembly 166 which comprises a portion of the synchronizing mechanism 168 which is made in accordance with this invention. This synchronizing mechanism includes the members 154 and 156 which comprise a flexible clutch mechanism which is similar to that made up of the members 42 and 44 of FIGS. 1 and 2. The member 156 comprises a plurality of contiguous sections mounted on a sleeve 170. As shown in FIG. 3 with respect to the member 44 of FIGS. 1 and 2, the contiguous surface members are pivotably mounted on the sleeve 170 so that they can rock to and fro in an axial direction and can slide along a selected portion of the axis of the sleeve 170. Crown teeth 172 of the member 156 are used for mounting purposes. These teeth engage teeth 174 which are mounted within the sleeve 170.

The synchronizing mechanism of FIG. 10 further includes a T-slot 176 and pin 178 which are used for synchronizing purposes in the same manner as the T-slot 62 and pin 60 of FIGS. 1 and 2. A detent ring 180 engages a slot 182 within the sleeve 112. The detent ring 180 normally holds the internal sleeve assembly 166 in the position shown in FIG. 10 while the member 154, which comprises a portion of the hub 108, is out of engagement with the member 156 of the internal sleeve assembly. The detent ring 180 is similar to the detent ring 70 shown in FIGS. 1 and 2.

Referring now to FIG. 10 with respect to the operation of the synchronizing, flexible coupling shown in FIGS. 10 and 11, the crown teeth 106 which are fastened to the pinion shaft 104 are out of engagement with the gear-teeth 110 which rotate with the quill shaft 100. To actuate the synchronizing, flexible coupling 102 so as to cause the teeth 106 to engage the teeth 110, fluid such as air or oil is forced through the passageway 160 from passages in the quill shaft (not shown). Pressure against the pistonhead 158 causes it to move toward the left in FIG. 10. The end member 148 of the piston 122 engages the Belleville washer 138 and through this engagement moves the sleeve 112 and the internal sleeve assembly 166 toward the left in FIG.

10. The teeth 110 and the sleeve 112 are, thus, moved toward the crown teeth 106. The movement continues until the contiguous surface members of the cone-like member 156 engage the surface of the conical member 154. Through this friction engagement, the speed of rotation of the pinion shaft 104 is synchronized with the speed of rotation of the quill shaft 100. The individual contiguous members of the cone-like member 156 of the flexible clutch mechanism can pivot on the crown teeth 172 in the event that the quill shaft and the pinion shaft 104 are not perfectly aligned.

Furthermore these contiguous members can move back and forth in the space on the sleeve 170 in which they are mounted. In this manner, as explained above with respect to the flexible clutch mechanism shown in FIGS. 1 and 2, the axis of the segmented cone-like member 156 can be effectively placed at an angle with respect to the axes of the shafts 100 and 104. The individual contiguous segments of the member 156 can oscillate between positions of contact with the member 154 which are necessary due to the misalignment.

The T-slot 176 and pin 178 coact to allow the teeth 106 and 110 to engage when the speed of the shaft 104 is synchronized with the speed of the shaft 100 as explained with respect to the T-slots and pins shown in FIGS. 4 through 7.

DESCRIPTION OF FIGS. 12 AND 13

Figure 12:
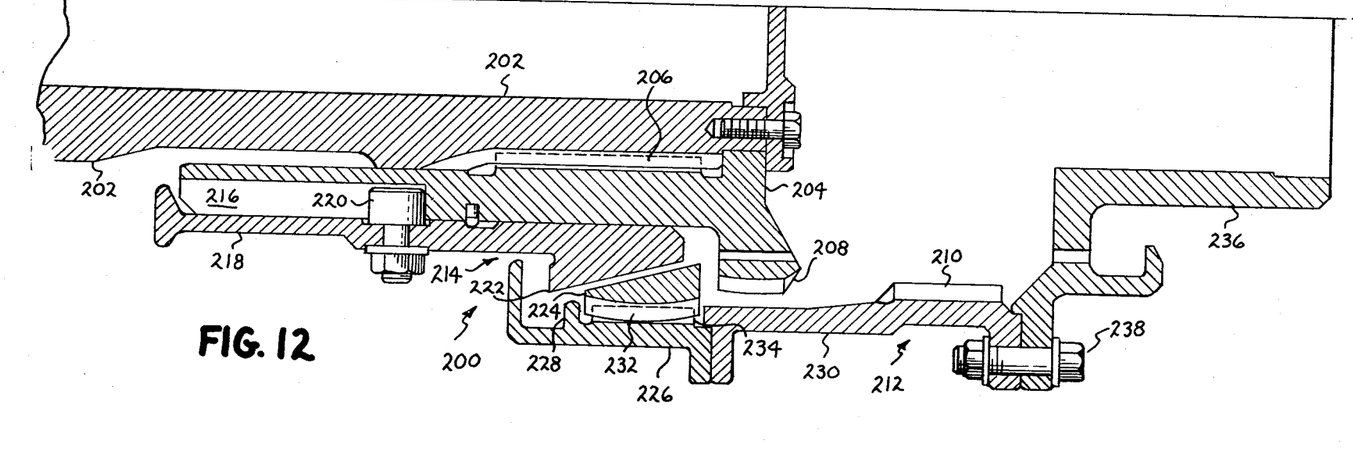
FIG. 12 is a partial cross-sectional view of still another rotatable coupling assembly according to this invention showing the flexible clutch mechanism with the teeth coupling disengaged.
Figure 13:
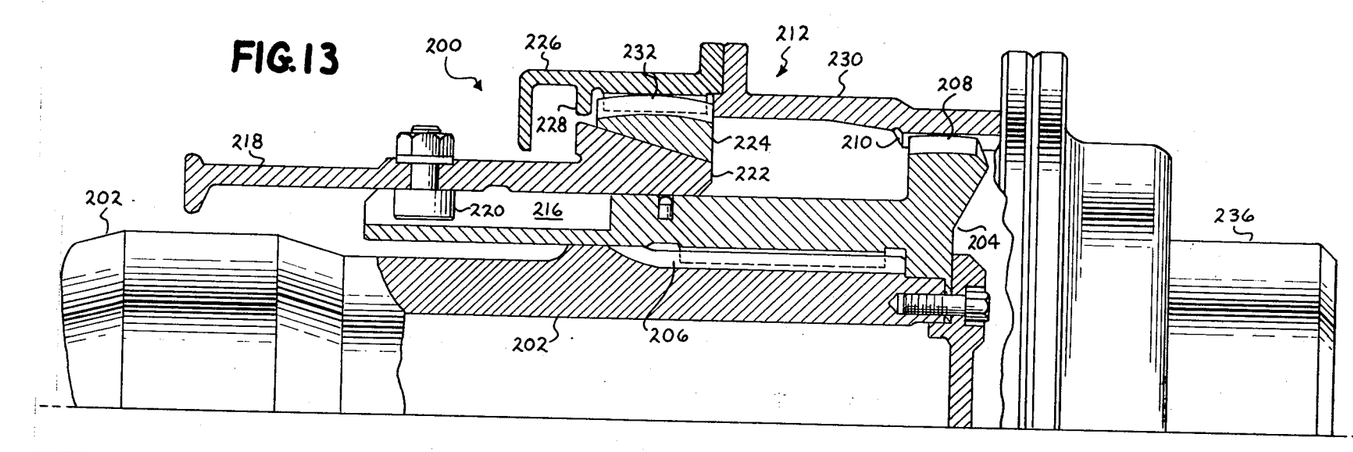
FIG. 13 is a partial cross-sectional view of the rotatable coupling assembly of FIG. 12 with the coupling teeth engaged.

FIGS. 12 and 13 show a portion of a rotatable clutch assembly or synchronizing, flexible coupling 200 of the type which is used for heavy duty applications. These drawings show only that portion of the rotatable clutch assembly 200 which includes the synchronizing mechanism and flexible clutch mechanism of this invention. The assembly itself comprises a coupling shaft 202 which is splined to a coupling hub 204 as shown generally at 206. The coupling hub 204 includes hub teeth 208 which are adapted to be connected to teeth 210 of a sleeve assembly 212.

A portion of a synchronizing mechanism 214 is included on the hub 204. T-slots 216 are formed in the hub 204, and a pressure ring 218 is mounted about the periphery of the hub 204. Pins 220 are attached to the pressure ring 218 so as to coact with the T-slots 216 in the manner descirbed with respect to the T-slots 62 and pins 60 in FIGS. 1 and 2. When the speeds of the two shafts connected to the clutch assembly or synchronizing, flexible coupling 200 are synchronized, the pin 220 can move in an axial direction within the T-slot 216 so as to allow the hub 208 to move toward the right in FIG. 12 to the position shown in FIG. 13. In this manner, the crown hub teeth 208 are connected to the sleeve teeth 210 when the sleeve of the two shafts are synchronized.

The synchronizing mechanism 214 further includes a flexible clutch mechanism in accordance with this invention including clutch members 222 and 224. In this embodiment of the invention, the clutch member 224 is pivotably mounted on a sleeve 226. The distance between a flange 228 of the sleeve 226 and one end of a sleeve 230 of the sleeve assembly 212 defines the area in which the contiguous clutch members of the member 224 have to move back and forth in an axial direction. Crown teeth 232 allow the contiguous clutch members of the member 224 to rock to and fro in an axial direction as described above with respect to the flexible clutch mechanism shown in FIGS. 1 and 2 and in FIGS. 10 and 11. The crown teeth 232 engage teeth 234 of the sleeve 226 for mounting purposes. The sleeve assembly 212 further includes an annular member 236 which is connected to the sleeve 230 through bolt assemblies 238. The annular member 236 is adapted to be connected to a shaft which, by way of example, is assumed to be the driven shaft. The drive shaft is normally, continuously coupled to the coupling shaft 202 through a sleeve assembly (not shown) having elongated sleeve teeth for engaging crown teeth of a hub which is fastened to the other end of the coupling shaft 202.

To actuate the synchronizing, flexible coupling shown in FIG. 12, the coupling shaft 202 is moved toward the right. A shifting collar and flange arrangement similar to that shown with respect to the shifting collar 36 of FIGS. 1 and 2 can be used for this purpose. As explained with respect to the embodiments shown in FIGS. 1 and 2 and in FIGS. 10 and 11, the crown teeth 208 move toward the sleeve teeth 210 until the members 222 and 228 of the flexible clutch mechanism make contact. At the time, the T-slot 216 and the pin or cam follower 220 prevent further movement of the crown teeth 208 toward the teeth 210 until the rotation of the shafts to be coupled is synchronized.

Again, as explained above, the individual contiguous members 228 can pivot or rock to and fro and can move back and forth in an axial direction between the flange 228 of the sleeve 226 and the end of the sleeve 230. Thus, the effective axis of the member 224 of the flexible clutch mechanism can be changed to allow the surface of the member 222 to contact the surface of the member 224 without damage to either of these even though the shafts to be interconnected are misaligned.

It is to be understood, of course, that the embodiments of this invention set forth herein are described in detail to present a full and clear description of the invention, and this invention is not limited to the details of the particular embodiments presented. Accordingly, various changes, modifications, and substitutions may be made in the embodiments described herein without departing from the true scope and spirit of this invention which is defined in the appended claims.

What I claim as new and desire to obtain by Letters Patent of the United States is:

1. A synchronizing mechanism for causing a first rotatable shaft to be connected to a second rotatable shaft when the speed of rotation of the first shaft equals the speed of rotation of the second shaft, said synchronizing mechanism comprising a portion of a rotatable clutch assembly which is normally, continuously connected to the second rotatable shaft, said synchronizing mechanism including a flexible clutch mechanism comprising, in combination:

a. A first member having frustro-conically shaped surface means;
   b. A second member having surface means for engaging said frustro-conically shaped surface means of said first member, with one of said first and second members rotating with the second rotatable shaft and the other of said first and second members including means for fastening it to the first rotatable shaft; and c. The clutch surface of at least one of said first and second members comprising a plurality of contiguous surface members, means for pivotably mounting said contiguous members about the axis of said at least one member so that each of said contiguous members can rock to and fro in an axial direction and can slide along a selected portion of the axis of said member.

2. A synchronizing mechanism according to claim 1 wherein said contiguous surface members are pivotably mounted on gear-teeth within a sleeve assembly.

3. A synchronizing mechanism according to claim 1 wherein said first member comprises a hub fastened to a rotatable shaft and said second member is mounted within a sleeve assembly comprising a portion of the rotatable clutch assembly which is normally, continuously connected to the second rotatable shaft through the use of pivotable connecting means.

4. A synchronizing mechanism according to claim 3 wherein said contiguous surface members comprise said second member.

5. A synchronizing mechanism according to claim 4 wherein the rotatable clutch assembly includes axially extending gear-teeth which are to be coupled to axially extented teeth on said hub, with one of said sets of gear-teeth comprising crown gear-teeth and the pivotable connecting means between the rotatable clutch assembly comprising crown gear-teeth.

6. A synchronizing mechanism according to claim 1 wherein the rotatable clutch assembly includes gear-teeth having means which allow the assembly to be connected to gear-teeth attached to the shafts with the axis of rotation of the rotatable clutch assembly intersecting the axes of rotation of the shafts.

7. A synchronizing mechanism according to claim 6 wherein the rotatable clutch assembly is connectable to a pinion shaft and to a quill shaft mounted within the pinion shaft.

8. A synchronizing mechanism according to claim 7 wherein the rotatable clutch assembly includes a pressure actuated piston to actuate said synchronizing mechanism, a hub connectable to the pinion shaft, a sleeve assembly connectable to the quill shaft, and said contiguous surface members being mounted within the sleeve assembly.

9. A synchronizing mechanism according to claim 6 wherein the rotatable clutch assembly includes a sleeve assembly connectable to the first rotatable shaft and includes a coupling shaft, with said sleeve assembly including means for mounting said contiguous surface members.

10. A synchronizing, flexible coupling for connecting a first rotatable shaft to a second rotatable shaft; said synchronizing, flexible coupling including a rotatable sleeve assembly having sleeve gear-teeth mounted therein and including first and second hubs adapted to be attached to the first rotatable shaft and to the second rotatable shaft, respectively; each of said hubs including hub gear-teeth to cause said hubs to slidably and pivotably interconnect with said sleeve through said sleeve gear-teeth; means for normally causing the second rotatable shaft to be continuously connected through said hub and sleeve teeth to said synchronizing flexible coupling; said synchronizing flexible coupling further including a synchronizing mechanism for causing the rotation of said sleeve assembly to become synchronized with the rotation of the first shaft prior to allowing said hub teeth on said first hub to become interconnected with said sleeve-teeth; said synchronizing mechanism including a flexible clutch mechanism comprising, in combination:

a. A first member having frustro-conically shaped surface means;

b. A second member having surface means for engaging said frustro-conically shaped surface means of said first member, one of said first and second members rotating with said sleeve assembly and the other of said first and second members including means for fastening it to the first rotatable shaft;

c. The clutch surface of at least one of said first and second members comprising a plurality of contiguous surface members pivotably mounted about its axis to allow each of said contiguous members to rock to and fro in an axial direction and mounting means for said contiguous members which allow said contiguous members to slide along a selected portion of the axis of said at least one member.

11. A synchronizing, flexible coupling according to claim 10 wherein said contiguous surface members comprise said second member and are mounted within said sleeve assembly.

12. A synchronizing, flexible coupling according to claim 11 wherein said contiguous surface members are pivotably mounted on crown teeth.

* * * * *